United States Patent
Kim et al.

(10) Patent No.: US 12,517,818 B2
(45) Date of Patent: Jan. 6, 2026

(54) STORAGE SPACE RECLAMATION VIA COLD FILE METADATA COMPRESSION

(71) Applicant: Samsung Electronics Co., Ltd., Suwon-si (KR)

(72) Inventors: Jaewook Kim, Suwon-si (KR); Yeongjin Gil, Suwon-si (KR); Woojoong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 130 days.

(21) Appl. No.: 18/462,110

(22) Filed: Sep. 6, 2023

(65) Prior Publication Data

US 2023/0409471 A1 Dec. 21, 2023

Related U.S. Application Data

(63) Continuation of application No. PCT/KR2022/000917, filed on Jan. 18, 2022.

(30) Foreign Application Priority Data

Mar. 15, 2021 (KR) .................. 10-2021-0033367

(51) Int. Cl.
*G06F 12/02* (2006.01)
(52) U.S. Cl.
CPC ................. *G06F 12/0238* (2013.01)
(58) Field of Classification Search
None
See application file for complete search history.

(56) References Cited

U.S. PATENT DOCUMENTS 6,460,044 B1 10/2002 Wang
6,522,268 B2 2/2003 Belu
(Continued)

FOREIGN PATENT DOCUMENTS

JP 2016004403 A 1/2016
JP 2016170526 A 9/2016
(Continued)

OTHER PUBLICATIONS

Extended European Search Report dated Jul. 24, 2024 issued in European Patent Application No. 22771584.4.
(Continued)

*Primary Examiner* — Arpan P. Savla
*Assistant Examiner* — Edmund H Kwong
(74) *Attorney, Agent, or Firm* — NIXON & VANDERHYE P.C.

(57) ABSTRACT

Disclosed is an electronic device comprising: a non-volatile memory configured to store at least one file including metadata and user data; a file system configured to manage the at least one file through a log stream; and a file system (FS) manager configured to monitor a free space log included in the log stream corresponding to a first free space of the non-volatile memory, and to transmit a compression request to the file system based on the size of the first free space, displayed on the free space log, having a value less than a first reference value. The file system may be configured to: based on the compression request being received, compress at least a part of the metadata stored in the non-volatile memory based on the log stream, to store same in the first free space; and display a second free space of the non-volatile memory, secured through the compression of the at least a part of the metadata, as a reserved block log in the log stream.

18 Claims, 18 Drawing Sheets

(56) References Cited

U.S. PATENT DOCUMENTS

| | | | |
|---|---|---|---|
| 8,521,948 | B2 | 8/2013 | Post et al. |
| 8,554,990 | B2 | 10/2013 | Kwon et al. |
| 8,819,336 | B2 | 8/2014 | Kwon et al. |
| 8,880,788 | B1 | 11/2014 | Sundaram et al. |
| 9,223,843 | B1 | 12/2015 | Madhavarapu et al. |
| 9,448,924 | B2 | 9/2016 | Sundaram et al. |
| 9,563,375 | B2 | 2/2017 | Chun |
| 9,880,762 | B1 * | 1/2018 | Armangau ............... G06F 3/067 |
| 10,042,853 | B2 | 8/2018 | Sundaram et al. |
| 10,241,908 | B2 | 3/2019 | Tomlin |
| 10,534,768 | B2 | 1/2020 | Madhavarapu et al. |
| 11,132,130 | B2 | 9/2021 | Eom et al. |
| 11,301,393 | B2 | 4/2022 | Lee |
| 2008/0263114 | A1 * | 10/2008 | Nath .................... G06F 16/2246 |
| 2012/0209893 | A1 * | 8/2012 | Kim ........................ G06F 16/17 707/822 |
| 2014/0075137 | A1 | 3/2014 | Shin |
| 2016/0253105 | A1 * | 9/2016 | Chang .................. G06F 3/0608 711/154 |
| 2016/0378352 | A1 | 12/2016 | Khan et al. |
| 2018/0039662 | A1 | 2/2018 | Asai et al. |
| 2019/0079859 | A1 * | 3/2019 | Li ....................... G06F 12/0246 |
| 2021/0064447 | A1 | 3/2021 | Kasahara |
| 2021/0294505 | A1 * | 9/2021 | Keller .................. G06F 3/0619 |

FOREIGN PATENT DOCUMENTS

| | | |
|---|---|---|
| KR | 20140035082 A | 3/2014 |
| KR | 101467939 B1 | 12/2014 |
| KR | 101469693 B1 | 12/2014 |
| KR | 20150018690 A | 2/2015 |
| KR | 101602939 B1 | 3/2016 |
| KR | 102033323 B1 | 10/2019 |
| KR | 102034833 B1 | 10/2019 |
| KR | 20200140534 A | 12/2020 |

OTHER PUBLICATIONS

International Search Report for PCT/KR2022/000917 mailed May 10, 2022, 2 pages.
Written Opinion of the ISA for PCT/KR2022/000917 mailed May 10, 2022, 4 pages.
Communication pursuant to Article 94(3) EPC dated Oct. 13, 2025 in EP application 22 771 584.4-1218.

* cited by examiner

| NODE ID | CONTENT |
|---|---|
| NB_1 | NODE BLOCK ADDRESS, OFFSET, COMPRESSION SIZE |
| NB_2 | NODE BLOCK ADDRESS, OFFSET, COMPRESSION SIZE |
| ⋮ | ⋮ |
| NB_n | NODE BLOCK ADDRESS, OFFSET, COMPRESSION SIZE |

FIG.9

| SEGMENT ID | CONTENT |
|---|---|
| SG_1 | COMPRESSION FLAG, VALID BLOCK BITMAP |
| SG_2 | COMPRESSION FLAG, VALID BLOCK BITMAP |
| ⋮ | ⋮ |
| SG_c | COMPRESSION FLAG, VALID BLOCK BITMAP |
| SG_c+1 | COMPRESSION FLAG, VALID BLOCK BITMAP |
| ⋮ | ⋮ |
| SG_c+i | COMPRESSION FLAG, VALID BLOCK BITMAP, FIRST OFFSET, FIRST COMPRESSION SIZE, SECOND OFFSET, SECOND COMPRESSION SIZE |

FIG.14

| SEGMENT ID | CONTENT |
|---|---|
| SG_1 | COMPRESSION FLAG, VALID BLOCK BITMAP |
| SG_2 | COMPRESSION FLAG, VALID BLOCK BITMAP |
| ⋮ | ⋮ |
| SG_d | COMPRESSION FLAG, VALID BLOCK BITMAP, FIRST OFFSET, FIRST COMPRESSION SIZE, SECOND OFFSET, SECOND COMPRESSION SIZE |
| ⋮ | ⋮ |
| SG_d+i | COMPRESSION FLAG, VALID BLOCK BITMAP |
| SG_d+i+1 | COMPRESSION FLAG, VALID BLOCK BITMAP |

STORAGE SPACE RECLAMATION VIA COLD FILE METADATA COMPRESSION

CROSS-REFERENCE TO RELATED APPLICATIONS

This application is a continuation of International Application No. PCT/KR2022/000917 designating the United States, filed on Jan. 18, 2022, in the Korean Intellectual Property Receiving Office and claiming priority to Korean Patent Application No. 10-2021-0033367, filed on Mar. 15, 2021, in the Korean Intellectual Property Office, the disclosures of each of which are incorporated by reference herein in their entireties.

BACKGROUND

Field

The disclosure relates to an electronic device including a non-volatile memory and a method for managing the non-volatile memory.

Description of Related Art

Semiconductor memory devices for storing data may include a volatile memory device and a non-volatile memory device. In the volatile memory device, such as a dynamic random access memory (DRAM), in which data is stored by charging or discharging a cell capacitor, stored data is maintained while power is applied, but stored data is lost when not powered. Meanwhile, the non-volatile memory device can store data even when not powered. The volatile memory device is mainly used as a main memory of an electronic device, and the non-volatile memory device is used as a large-capacity memory for storing programs and data in a wide range of application devices.

Electronic devices such as a smart phone may include the volatile memory device and the non-volatile memory device. The electronic device may store various types of data in the volatile memory device and the non-volatile memory device.

In the non-volatile memory included in the electronic device, invalid pages may occur between valid pages during use, and when the number of invalid pages increases, a garbage collection may be performed to secure free spaces. However, when the number of garbage collections increases due to a lack of empty space and the garbage collection is performed during a write operation with respect to the non-volatile memory, the performance of the electronic device may deteriorate.

SUMMARY

Various embodiments of the disclosure provide an electronic device capable of reducing the number of times of garbage collection execution of a non-volatile memory by newly securing an empty space by compressing a file that satisfies a specified condition (e.g., metadata of a cold file) in the non-volatile memory, and by reserving the newly secured empty space.

According to an example embodiment of the disclosure, an electronic device includes: a non-volatile memory configured to store at least one file including meta data and user data, a file system configured to manage the at least one file through a log stream, and a file system (FS) manager configured to monitor a free space log included in the log stream corresponding to a first free space of the non-volatile memory and to transmit a compression request to the file system based on a size of the first free space indicated in the free space log being less than a first reference value. The file system, based on the compression request being received, is configured to compress at least some of the meta data stored in the non-volatile memory based on the log stream and to store the compressed data in the first free space, and to indicate a second free space of the non-volatile memory secured through compression of the at least some of the meta data as a reserved block log in the log stream.

In addition, according to an example embodiment of the disclosure, a memory management method of an electronic device including a non-volatile memory includes: monitoring, by a file system (FS) manager, a free space log corresponding to a first free space of the non-volatile memory in a log stream generated to manage at least one file stored in the non-volatile memory, transmitting a compression request from the FS manager to a file system managing the log stream based on a size of the first free space indicated in the free space log being less than a first reference value, selecting, by the file system, a first segment including an uncompressed node block log from the log stream, selecting, by the file system, at least one uncompressed node block log included in the selected segment, storing, by the file system, a compressed node block log obtained by compressing the at least one node block log in a last segment of the log stream, storing, by the file system, a compressed node block corresponding to the compressed node block log in the first free space of the non-volatile memory, and indicating, by the file system, a second free space of the non-volatile memory secured through compression of the at least one node block log as a reserved block log in the log stream when a compression end condition is satisfied.

In addition, according to an example embodiment of the disclosure, a memory management method of an electronic device including a non-volatile memory includes: monitoring, by a file system (FS) manager, a free space log corresponding to a first free space of the non-volatile memory in a log stream generated to manage at least one file stored in the non-volatile memory, transmitting a compression request from the FS manager to a file system managing the log stream based on a size of the first free space indicated in the free space log being less than a first reference value, selecting, by the file system, a first uncompressed segment from the log stream, storing, by the file system, a compressed segment obtained by compressing the selected segment in a last segment of the log stream, storing, by the file system, compressed blocks obtained by compressing node blocks corresponding to the selected segment in the first free space of the non-volatile memory, and indicating, by the file system, a second free space of the non-volatile memory secured through compression of the selected segment as a reserved block log in based on a compression end condition being satisfied.

According to various example embodiments disclosed in the disclosure, the number of garbage collection executions of a non-volatile memory included in an electronic device may be reduced.

According various example embodiments disclosed in the disclosure, the lifespan of a non-volatile memory included in an electronic device may be extended.

According to various example embodiments disclosed in the disclosure, performance degradation of an electronic device due to execution of garbage collection during a write operation may be prevented and/or reduced.

In addition to this, various effects identified directly or indirectly through this disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 9 is a diagram illustrating an example of a node address table of FIG. 7 according to various embodiments;

FIG. 14 is a diagram illustrating an example of a segment information table of FIG. 13 according to various embodiments;

FIG. 18 is a diagram illustrating an example of a segment information table of FIG. 17 according to various embodiments.

In connection with the description of the drawings, the same or similar reference numerals may be used for the same or similar components.

DETAILED DESCRIPTION

Figure 1:
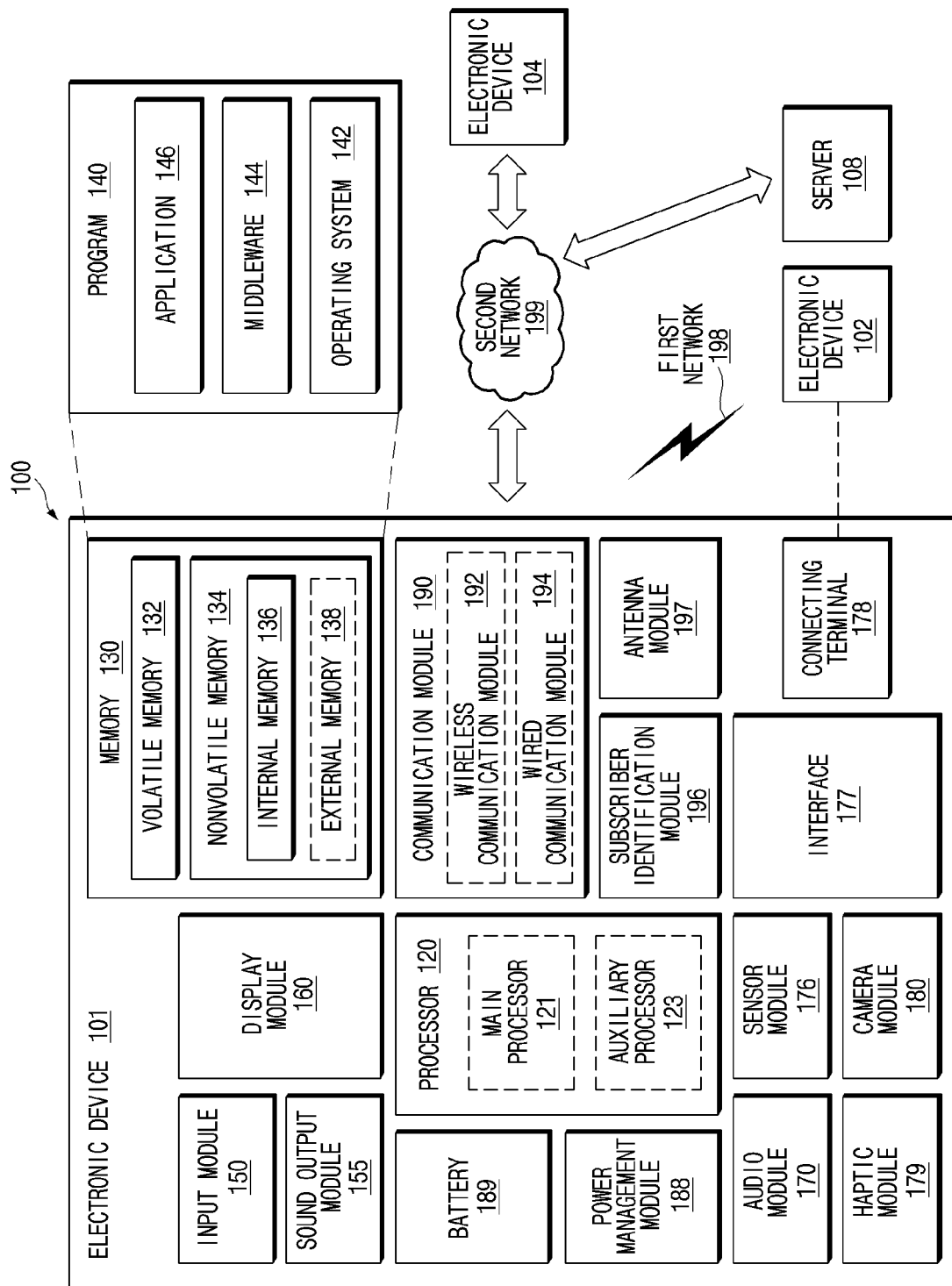
FIG. 1 is a block diagram illustrating an example electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
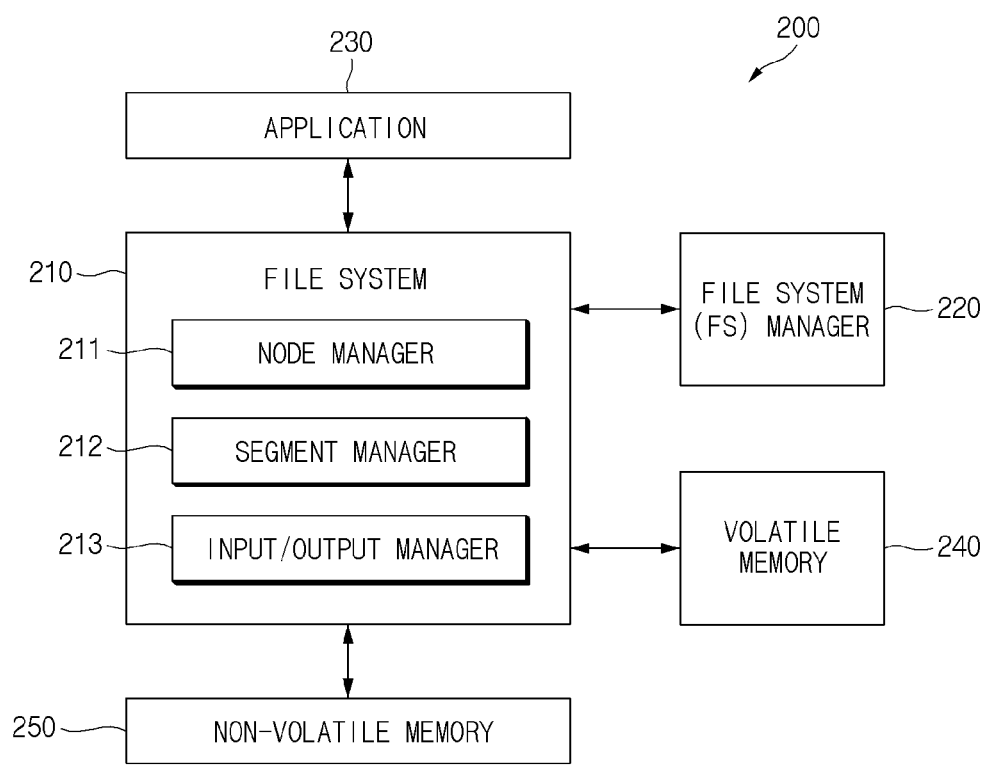
FIG. 2 is a block diagram illustrating an example configuration of a file system managing files stored in a non-volatile memory in an electronic device according to various embodiments.
Figure 3:
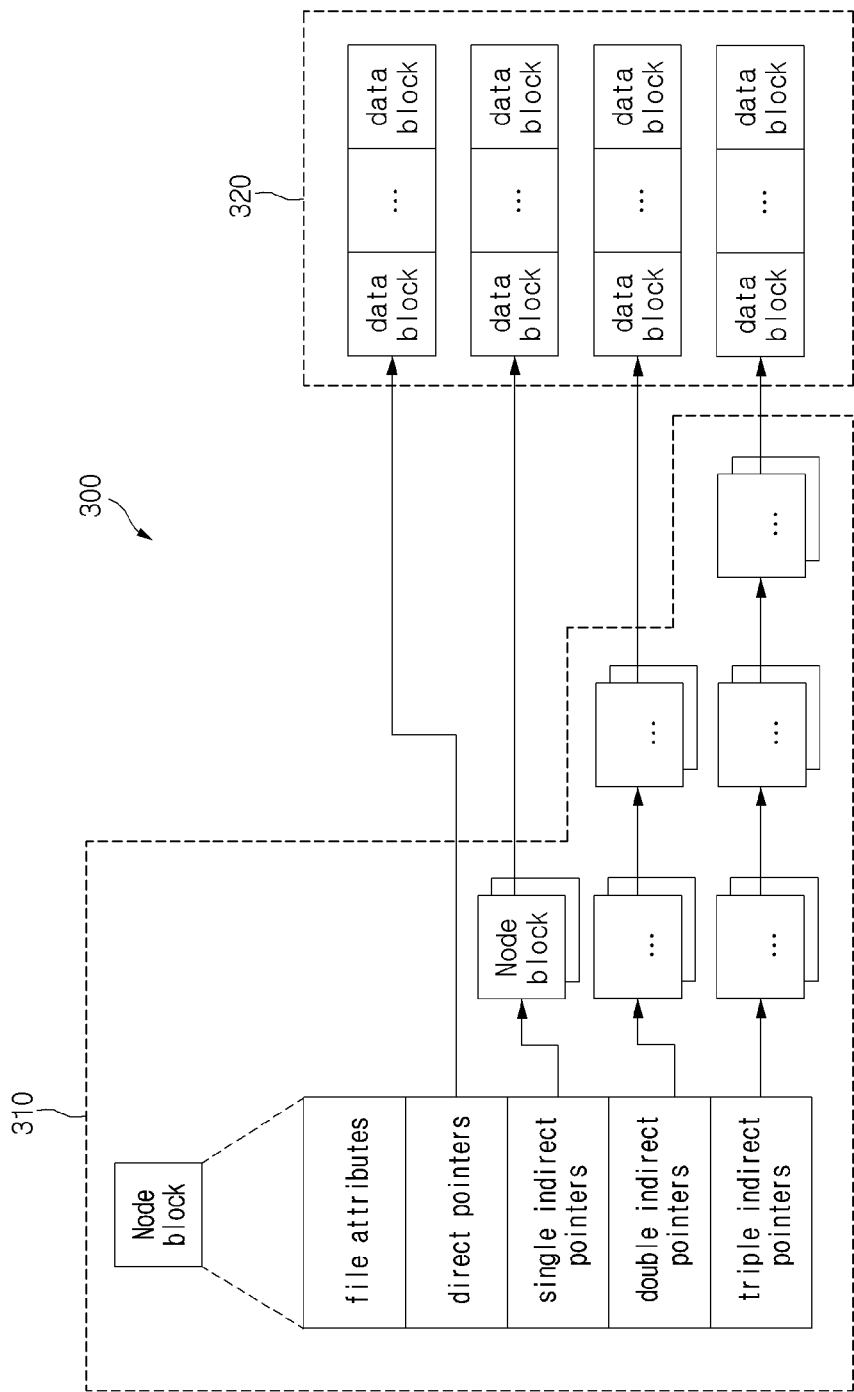
FIG. 3 is a diagram illustrating an example structure of one file managed by a file system of FIG. 2 according to various embodiments.
Figure 4:
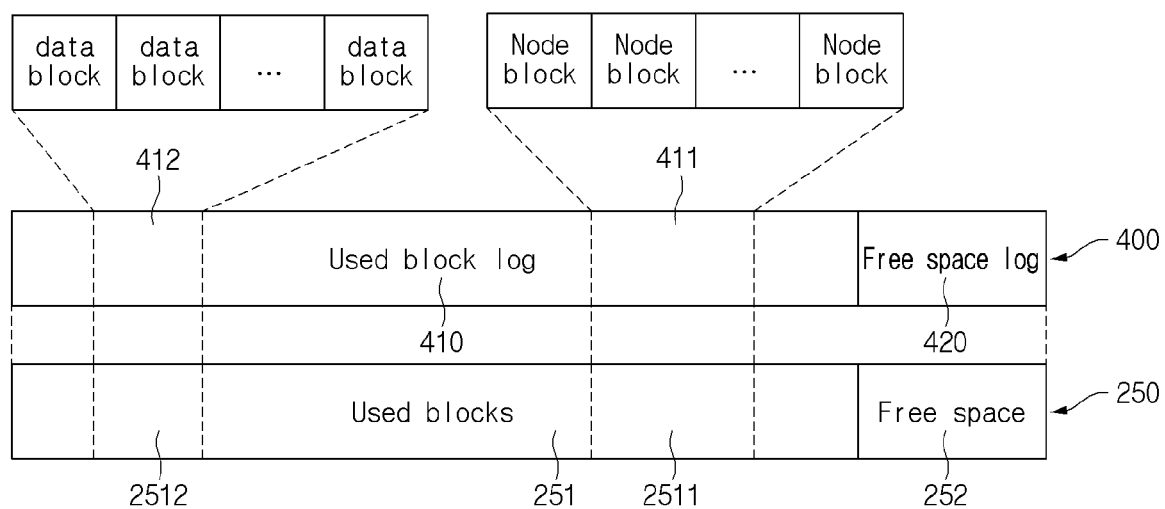
FIG. 4 is a diagram illustrating an example non-volatile memory and a log stream corresponding thereto before execution of a reserved compression operation, according to various embodiments.
Figure 5:
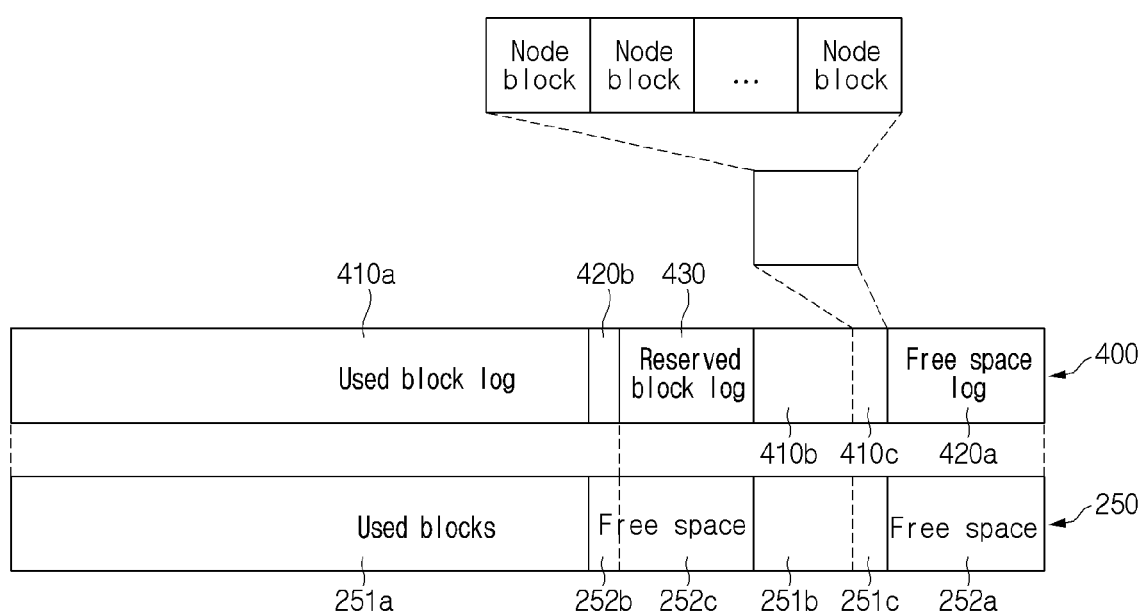
FIG. 5 is a diagram illustrating an example non-volatile memory and a log stream corresponding thereto after execution of a reserved compression operation, according to various embodiments.

FIG. 2 is a block diagram illustrating an example configuration of a file system managing files stored in a non-volatile memory in an electronic device according to various embodiments. FIG. 3 is a diagram illustrating an example structure of one file managed by a file system of FIG. 2 according to various embodiments. FIG. 4 is a diagram illustrating an example non-volatile memory and a log stream corresponding thereto before execution of a reserved compression operation, according to various embodiments. FIG. 5 is a diagram illustrating an example non-volatile memory and a log stream corresponding thereto after execution of a reserved compression operation, according to various embodiments.

Referring to FIGS. 2 to 5, an electronic device 200 (e.g., the electronic device 101 of FIG. 1) may include a file system 210, a file system (FS) manager 220, an application 230, and a volatile memory 240 (e.g., the volatile memory 132 of FIG. 1), and a non-volatile memory 250 (e.g., the non-volatile memory 134 of FIG. 1). In various embodiments, one or more other components may be added to the electronic device 200. The file system 210, the FS manager 220, or the application 230 may be implemented by software (e.g., the program 140 of FIG. 1), hardware (e.g., the processor 120 of FIG. 1), or a combination thereof. The file system 210 may include a node manager 211, a segment manager 212 and an I/O manager 213. For example, the file system 210, the FS manager 220, or the application 230 may be a module related to a program (e.g., the program 140 of FIG. 1) executed by a processor (e.g., the processor 120 of FIG. 1), and may be configured by being loaded into (or included) the volatile memory 240.

According to an embodiment, the file system 210 may manage files stored in the non-volatile memory 250. For example, referring to FIG. 3, the file system 210 may manage one file 300 by classifying the one file 300 into meta data 310 and user data 320. The meta data 310 may include a name, position, size, and time information of the user data 320 or attribute information of a corresponding file, such as whether or not it is deleted. The meta data 310 may include at least one node block. The user data 320 may include at least one data block. The one node block may include file attributes and at least one pointer. The at least one pointer may indicate a position of at least some of data blocks included in the user data 320. For example, the at least one pointer may include a direct pointer and an indirect pointer. The direct pointer may directly match a data block. The indirect pointer may be matched to a data block through at least one other node block.

According to an embodiment, the file system 210 may compress a file stored in the non-volatile memory 250 through a reserved compression operation of the disclosure. For example, during the reserved compression operation, the file system 210 may select and compress a file (e.g., a cold file) that is not frequently accessed. Also, since a data block of a large-capacity file such as a multimedia file is already compressed through its own codec, compression efficiency may be low even if compression is attempted again. In contrast, the large-capacity file may be matched to a data block using multiple node blocks. In addition, since the node block of the large-capacity file may include pointers for constructing a tree, compression efficiency may be greater than that of the data block. Accordingly, during the reserved compression operation, the file system 210 may select and compress a node block.

According to an embodiment, the file system 210 may include a log-structured file system. For example, the file system 210 may manage files stored in the non-volatile memory 250 through a log stream 400. The log stream 400 may be defined as a list of segments allocated to the non-volatile memory 250. The segment manager 212 of the file system 210 may manage the log stream 400. The segment manager 212 may allocate or release segments to the log stream 400. When a file is stored in the non-volatile memory 250, the segment manager 212 may allocate a new segment to the non-volatile memory 250. The I/O manager 213 of the file system 210 may store a file block (e.g., a node block or a data block) in the new segment. A plurality of file blocks may be stored in one segment. The segment manager 212 may designate the number of file blocks stored in one segment. The file blocks stored in one segment may be continuously stored in the non-volatile memory 250.

According to an embodiment, the segment manager 212 may generate the log stream 400 corresponding to the non-volatile memory 250. For example, referring to FIG. 4, the segment manager 212 may generate used block logs 410 mapped to used blocks 251 of the non-volatile memory 250 in the log stream 400. The used block logs 410 include node block logs 411 mapped to node blocks 2511 (e.g., the meta data 310) and data block logs 412 mapped data blocks 2512 (e.g., the user data 320). The segment manager 212 may generate a free space log 420 mapped to a free space 252 of the non-volatile memory 250 in the log stream 400. The segment manager 212 may store and manage the log stream 400 in the volatile memory 240. FIG. 4 may illustrate the log stream 400 with respect to the non-volatile memory 250 before execution of the reserved compression operation of the disclosure.

According to an embodiment, the free space log 420 may include information associated with a size of the free space 252 of the non-volatile memory 250. According to an embodiment, the free space log 420 may be stored in the volatile memory 240. For example, the free space log 420 may include at least some information associated with a free space (e.g., a first free space 252a) stored in the non-volatile memory 250.

According to an embodiment, the FS manager 220 may monitor the free space log 420. For example, when the size of the free space 252 indicated in the free space log 420 is less than a designated first reference value, the FS manager 220 may transmit a compression request to the file system 210. When the size of the free space 252 indicated in the free space log 420 is greater than a designated second reference value, the FS manager 220 may transmit a decompression request to the file system 210. For example, the second reference value may be set greater than the first reference value. As another example, the second reference value may be set equal to the first reference value.

According to an embodiment, the node manager 211 of the file system 210 may manage node block logs. For example, upon receiving the compression request, the node manager 211 may select a node block log (e.g., the node block logs 411) to be compressed among the node block logs, may compress the selected node block log, and may store the compressed node block log (e.g., a compressed node block log 410c) in the log stream 400. The segment manager 212 may allocate a new segment in which the compressed node block log is to be stored. The I/O manager 213 may manage data input/output between the volatile memory 240 and the non-volatile memory 250. The I/O manager 213 may compress the node block (e.g., the node blocks 2511) corresponding to the selected node block log (e.g., the node block logs 411) based on the compressed node block log to store the compressed node block in a free space (e.g., the free space 252) of the non-volatile memory 250.

For example, FIG. 5 illustrates the log stream 400 with respect to the non-volatile memory 250 after execution of the reserved compression operation according to the compression request. Referring to FIGS. 4 and 5, upon receiving the compression request, the node manager 211 may select the node block logs 411 that satisfy a specified condition (e.g., selecting meta data of a cold file). The node manager 211 may generate the compressed node block log 410c by compressing the node block logs 411. The node manager 211 may store the compressed node block log 410c in a new segment. The segment manager 212 may allocate the new segment in which the compressed node block log 410c is to be stored. The segment manager 212 may update the free space log 420 to a changed first free space log 420a corresponding to the changed first free space 252a of the non-volatile memory 250. The I/O manager 213 may store a compressed node block 251c obtained by compressing the node blocks 2511 of the non-volatile memory 250 corresponding to the node block logs 411 in the free space 252. To maintain the size of the existing free space 252, a second free space 252b corresponding to the size of the compressed node block 251c may be set. The node manager 211 may generate a second free space log 420b to match the second free space 252b. The first free space log 420a and the second free space log 420*b* may indicate the same size as that of the existing free space 252. Used block logs 410*a* and 410*b* corresponding to existing used blocks 251*a* and 251*b* may be maintained as they are. By compressing the node block logs 411, a new third free space 252*c* may be generated in the non-volatile memory 250. The segment manager 212 may set a reserved block log 430 corresponding to the newly secured third free space 252*c* in the non-volatile memory 250. For example, the segment manager 212 may manage a free block count and a reserved block count. The free block count may be defined as metadata managing the number of blocks usable in the file system 210. The reserved block count may be defined as meta data that manages block counts before compression of compressed blocks in the file system 210. A current count of each of the free block count and the reserved block count may be stored and managed in a super block managing meta data required for the file system 210. The file system 210 may block access of the application 230 with respect to the new third free space 252*c* corresponding to the reserved block log 430. Accordingly, the size of the free space (e.g., the first free space 252*a*, the second free space 252*b*, or the third free space 252*c*) in the non-volatile memory 250 may be maintained to be greater than the size of the reserved block log 430. When the size of the reserved block log 430 remains the same as the size that is the criterion for garbage collection, the free space may be secured as much as the size of the reserved block log 430 in the non-volatile memory 250, and the number of occurrences of garbage collection in the non-volatile memory 250 may decrease based on the secured free space.

Figure 6:
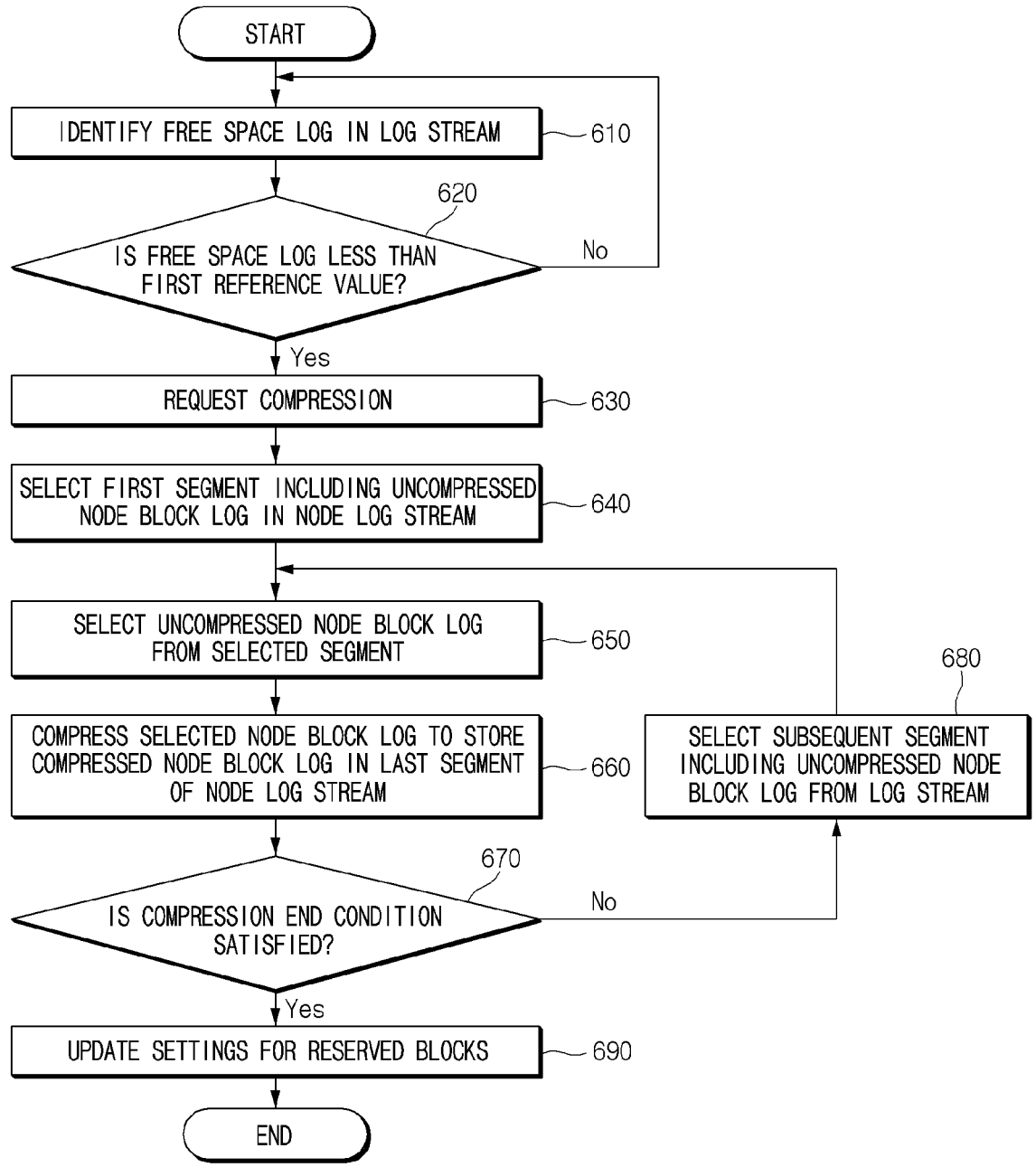
FIG. 6 is a flowchart illustrating an example data compression method, according to various embodiments.
Figure 7:
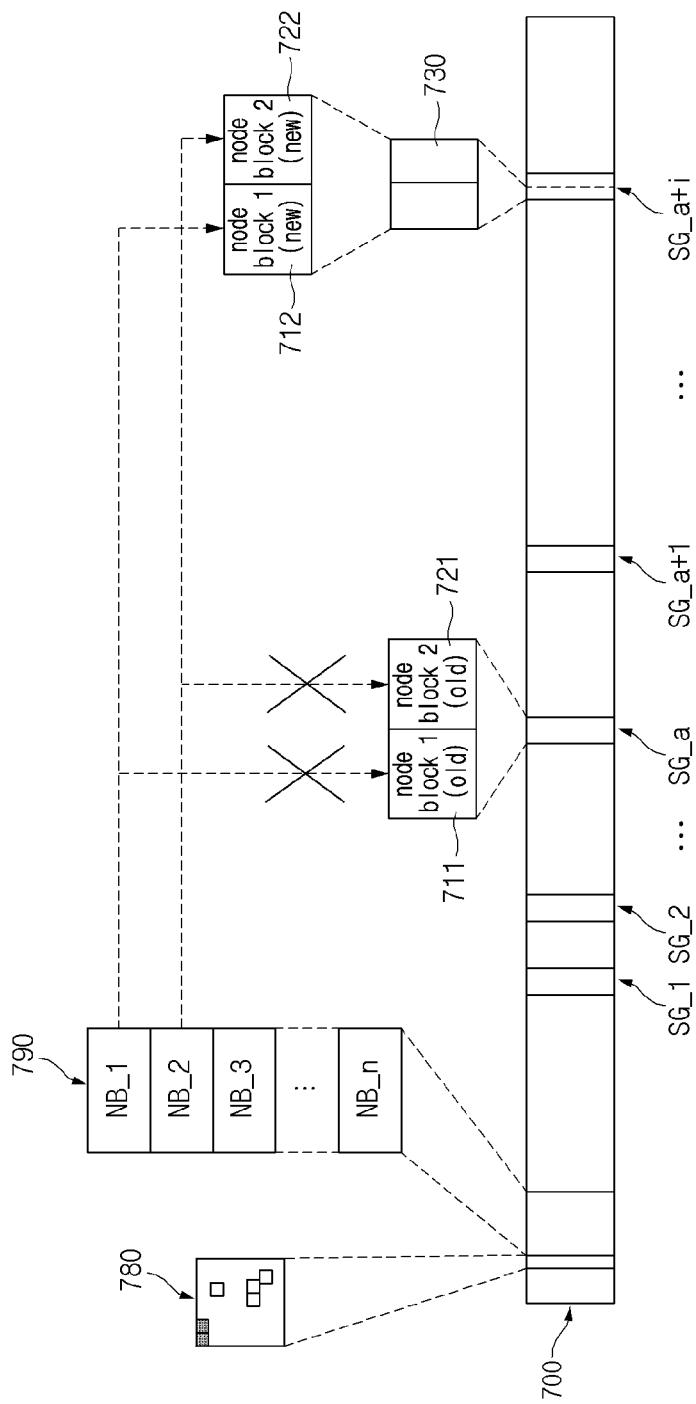
FIG. 7 is a diagram illustrating an example of a data compression method of FIG. 6 according to various embodiments.
Figure 8:
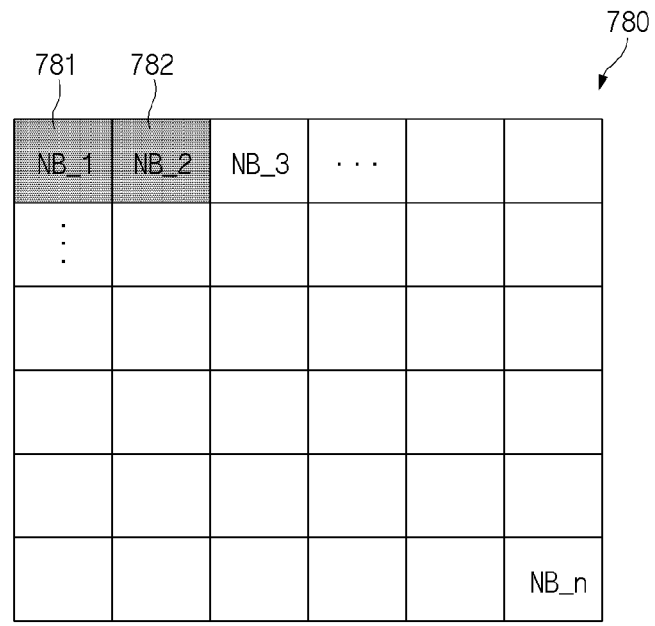
FIG. 8 is a diagram illustrating an example of a compressed node bitmap of FIG. 7 according to various embodiments.

FIG. 6 is a flowchart illustrating an example data compression method, according to various embodiments. FIG. 7 is a diagram illustrating an example of a data compression method of FIG. 6 according to various embodiments. FIG. 8 is a diagram illustrating an example of a compressed node bitmap of FIG. 7 according to various embodiments. FIG. 9 is a diagram illustrating an example of a node address table of FIG. 7 according to various embodiments.

Referring to FIGS. 2 and 6 to 9, the file system 210 may manage files stored in the non-volatile memory 250 through the log stream (e.g., the log stream 400). For example, the file system 210 may separate and manage log streams based on data attributes. For example, the file system 210 may separate and manage the log streams with respect to the meta data (e.g., the meta data 310 of FIG. 3) and the user data (e.g., the user data 320 of FIG. 3). FIG. 7 may illustrate a node log stream 700 with respect to the meta data. As another example, the file system 210 may separate and manage the log streams with respect to cold files (e.g., infrequently accessed files) and hot files (e.g., frequently accessed files). In this case, FIG. 7 may illustrate the node log stream 700 with respect to the meta data of the cold file. The node log stream 700 may include at least one of segments SG_1, SG_2, . . . , SG_a, SG_a+1, . . . , and SG_a+i. One segment included in the log stream 700 may store a plurality of node block logs. However, for convenience of description below, it is assumed that one segment stores two node block logs.

According to an embodiment, in operation 610, the FS manager 220 may identify the free space log (e.g., the free space log 420 of FIG. 4) in the node log stream 700. For example, the node log stream 700 may include the free space log corresponding to the first free space (e.g., the free space 252, the first and second free spaces 252*a* and 252*b*, or the free space that is not set to the reserved block log) of the non-volatile memory 250. The FS manager 220 may monitor the free space log.

According to an embodiment, in operation 620, when the size of the first free space indicated in the free space log is greater than or equal to a first reference value, the FS manager 220 may continuously monitor the free space log of the node log stream 700. When the size of the first free space indicated in the free space log is less than the first reference value, the FS manager 220 may perform operation 630.

According to an embodiment, in operation 630, the FS manager 220 may transmit a compression request to the file system 210.

According to an embodiment, in operation 640, the file system 210 may select a first segment (e.g., the segment SG_a) including an uncompressed node block log (e.g., a first node block log 711) from the node log stream 700 in response to the compression request. For example, in FIG. 7, the node manager 211 of the file system 210 may select the segment SG_a including the uncompressed first node block log 711 based on a compressed node bitmap 780 and a node address table 790. The segments (e.g., SG_1 and SG_2) preceding the segment SG_a may include the compressed node block logs or may be invalidated segments. Referring to FIG. 8, the compressed node bitmap 780 may indicate whether node block logs are compressed. A first bit 781 may indicate whether the first node block log 711 is compressed. A second bit 782 may indicate whether a second node block log 721 is compressed. For example, when the first node block log 711 is not compressed, the first bit 781 may be unchecked or indicated as logic '0'. When the first node block log 711 is compressed, the first bit 781 may be checked or indicated as logic '1'. Referring to FIG. 9, the node address table 790 may include items such as node block addresses, offsets, and compression sizes. The node block address may indicate a segment (e.g., segment SG_a) including the corresponding node block log (e.g., the first node block log 711). The offset and the compression size may be indicated when the corresponding node block log is compressed (e.g., a first compressed node block log 712).

According to an embodiment, in operation 650, the file system 210 may select an uncompressed node block log from the selected segment. For example, in FIG. 7, the node manager 211 may select all uncompressed node block logs in the selected segment SG_a. For example, the node manager 211 may select the first node block log 711 and the second node block log 721.

According to an embodiment, in operation 660, the file system 210 may compress the selected node block log to store the compressed node block log in the last segment of the node log stream 700. For example, in FIG. 7, the segment manager 212 of the file system 210 may newly allocate a segment SG_a+i to the node log stream 700. The node manager 211 may store a compressed node block log 730 in the segment SG_a+i. The compressed node block log 730 may include the first compressed node block log 712 corresponding to the first node block log 711 and a second compressed node block log 722 corresponding to the second node block log 721. The node manager 211 may update the compressed node bitmap 780 and the node address table 790. For example, in the compressed node bitmap 780, the node manager 211 may change the first bit 781 corresponding to a first node block NB_1 and the second bit 782 corresponding to a second node block NB_2 to logic '1'. In the node address table 790, the node manager 211 may change the node block addresses of the first node block NB_1 and the second node block NB_2, and may add offsets and compression sizes.

According to an embodiment, in operation 670, the file system 210 may determine whether compression end condition is satisfied. For example, the compression end condition may include when compression of a specified number of node block logs is performed, when a specified compression execution time elapses, or when a target compression capacity is satisfied. When the compression end condition is not satisfied, in operation 680, the file system 210 may select a subsequent segment including the uncompressed node block log from the node log stream 700, and may repeat operations 650 and 660. The file system 210 may repeat operations 650, 660, and 680 until the compression end condition is satisfied. When the compression end condition is satisfied, the file system 210 may perform operation 690.

According to an embodiment, in operation 690, the file system 210 may update settings for reserved blocks. For example, the I/O manager 213 of the file system 210 may compress a first node block of the non-volatile memory 250 corresponding to the first node block log 711 and a second node block of the non-volatile memory 250 corresponding to the second node block log 721 based on the compressed node block log 730, and may store the compressed node block corresponding to the compressed node block log 730 in the free space (e.g., a part of the first free space) of the non-volatile memory 250 corresponding to the segment SG_a+i. The file system 210 may set a reserved block log (e.g., the reserved block log 430) in the segment SG_a corresponding to a second free space (e.g., the third free space 252c of FIG. 5) of the non-volatile memory 250 secured by deleting the first node block and the second node block. The file system 210 may block access of the application 230 to the second free space corresponding to the reserved block log. When the second free space corresponding to the reserved block log is recognized as a free space in the non-volatile memory 250 and when the second free block having the same size as the standard free space size in which garbage collection is performed is secured through the reserved block log, the number of executions of garbage collection may decrease.

Figure 10:
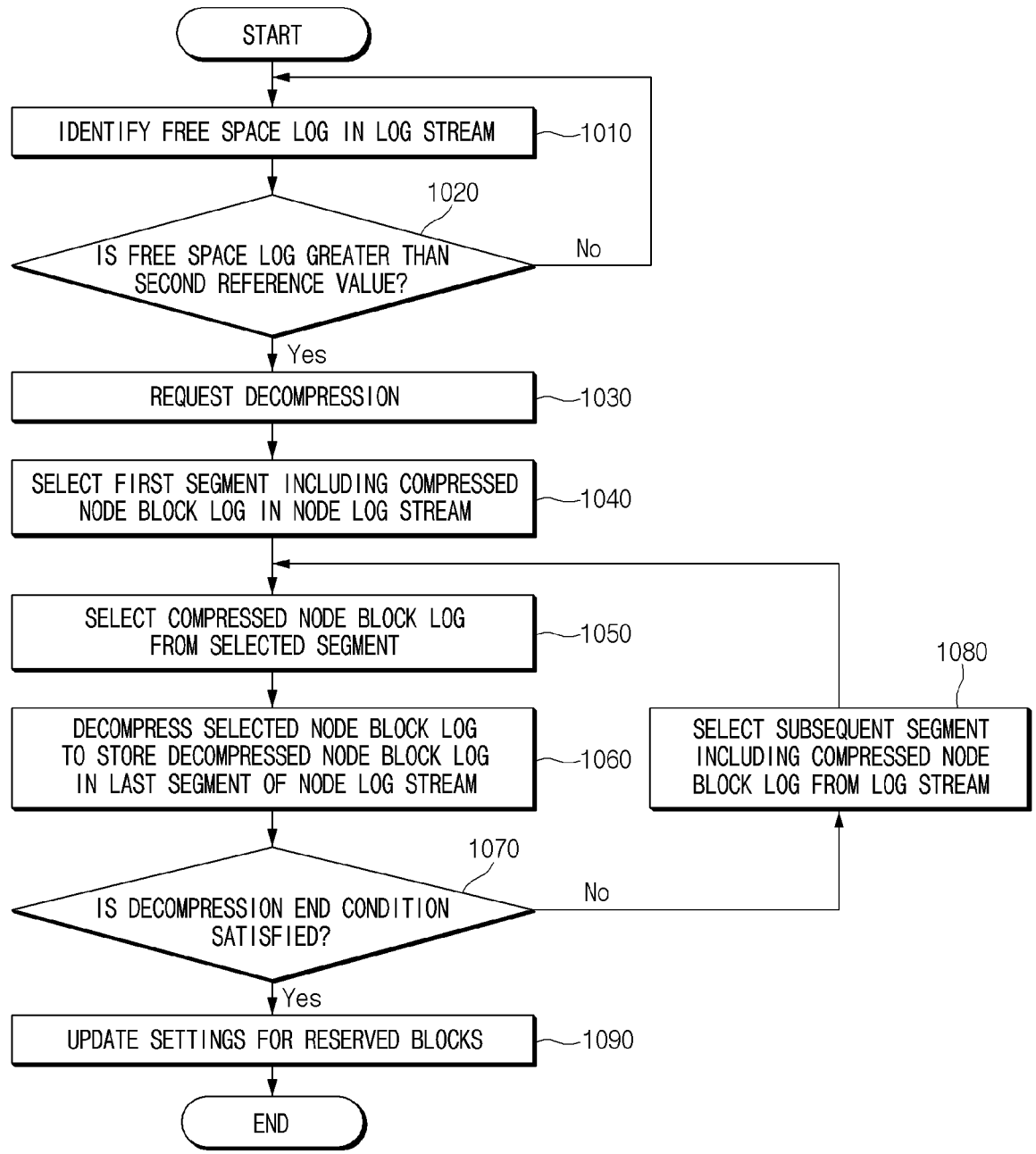
FIG. 10 is a flowchart illustrating an example method of decompressing compressed data, according to various embodiments.
Figure 11:
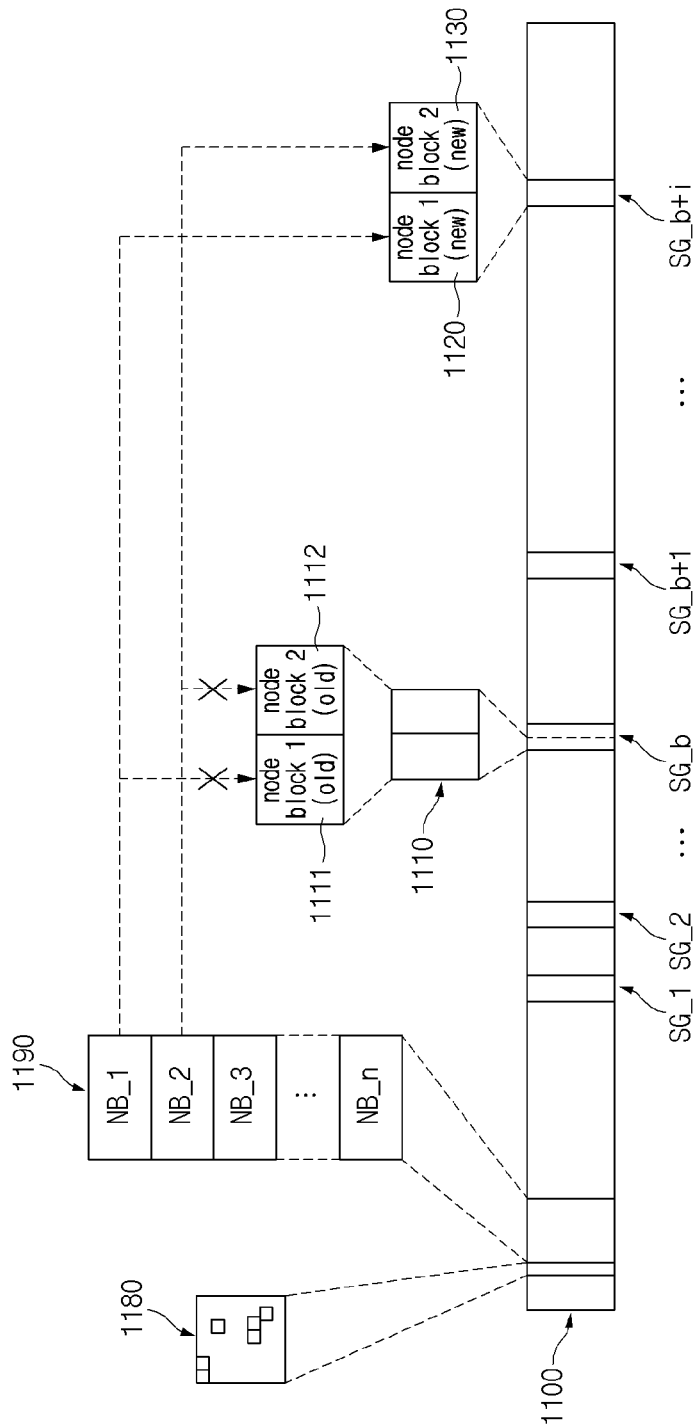
FIG. 11 is a diagram illustrating an example of a method for decompressing compressed data of FIG. 10 according to various embodiments.

FIG. 10 is a flowchart illustrating an example method of decompressing compressed data, according to various embodiments. FIG. 11 is a diagram illustrating an example of a method for decompressing compressed data of FIG. 10 according to various embodiments.

Referring to FIGS. 2, 10 and 11, the file system 210 may decompress the node block compressed through the data compression method of FIG. 6 again.

According to an embodiment, in operation 1010, the FS manager 220 may identify the free space log (e.g., the free space log 420 of FIG. 4) in a node log stream 1100. For example, the node log stream 1100 may include the free space log corresponding to the first free space (e.g., the free space 252, the first and second free spaces 252a and 252b, or the free space that is not set to the reserved block log) of the non-volatile memory 250. The FS manager 220 may monitor the free space log.

According to an embodiment, in operation 1020, when the size of the first free space indicated in the free space log is less than or equal to a second reference value, the FS manager 220 may continuously monitor the free space log of the node log stream 700. When the size of the first free space indicated in the free space log is greater than the second reference value, the FS manager 220 may perform operation 1030. For example, the second reference value may be set to be greater than the first reference value of FIG. 6. As another example, the second reference value may be set to be the same as the first reference value of FIG. 6.

According to an embodiment, in operation 1030, the FS manager 220 may transmit a decompression request to the file system 210.

According to an embodiment, in operation 1040, the file system 210 may select a first compressed segment (e.g., the segment SG_b) including a compressed node block log (e.g., a compressed node block log 1110) in the node log stream 700 in response to the compression request. For example, in FIG. 11, the node manager 211 of the file system 210 may select the segment SG_b including the compressed node block log 1110 that is compressed based on a compressed node bitmap 1180 (e.g., the compressed node bitmap 780 of FIG. 8) and a node address table 1190 (e.g., the node address table 790 of FIG. 9). For example, the compressed node block log 1110 may include a first compressed node block log 1111 and a second compressed node block log 1112. In the compressed node bitmap 1180, a first bit corresponding to the first node block NB_1 and a second bit corresponding to the second node block NB_2 may be indicated by logic '1'. The node address table 1190 may indicate node block addresses (e.g., the segment SG_b) of the first node block NB_1 and the second node block NB_2, the offset and compression size of the first node block NB 1, and the offset and compression size of the second node block NB_2.

According to an embodiment, in operation 1050, the file system 210 may select a compressed node block log from the selected compressed segment. For example, in FIG. 11, the node manager 211 may select all compressed node block logs in the selected segment SG_b. For example, the node manager 211 may select the first compressed node block log 1111 and the second compressed node block log 1112.

According to an embodiment, in operation 1060, the file system 210 may decompress the selected node block log and may store the decompressed node block log in the last segment of the node log stream 1100. For example, in FIG. 11, the segment manager 212 of the file system 210 may newly allocate a segment SG_b+i to the node log stream 1100. The node manager 211 may store a decompressed first node block log 1120 and a decompressed second node block log 1130 in the segment SG_b+i. The node manager 211 may update the compressed node bitmap 1180 and the node address table 1190. For example, in the compressed node bitmap 1180, the node manager 211 may change the first bit corresponding to the first node block NB_1 and the second bit corresponding to the second node block NB_2 to logic '0'. In the node address table 1190, the node manager 211 may change the node block addresses (e.g., the segment SG_b+i) of the first node block NB_1 and the second node block NB_2, and may delete the offset and compression size.

According to an embodiment, in operation 1070, the file system 210 may determine whether a decompression end condition is satisfied. For example, the decompression end condition may include when a size of the first free space indicated in the free space log of the log stream 1100 reaches a specified size (e.g., a value greater than or equal to the first reference value and less than or equal to the second reference value) or when all compressed node block logs are decompressed. Alternatively, the decompression end condition may include when decompression of a specified number of node block logs is performed, when a specified decompression execution time elapses, or when the size of the first free space indicated in the free space log of the non-volatile memory 250 is insufficient. When the decompression end condition is not satisfied, in operation 1080, the file system 210 may select the subsequent compressed segment including the compressed node block log from the node log stream 1100, and may repeat operations 1050 and 1060. The file system 210 may repeat operations 1050, 1060, and 1080 until the decompression end condition is satisfied. When the decompression end condition is satisfied, the file system 210 may perform operation 1090.

According to an embodiment, in operation 1090, the file system 210 may update settings for reserved blocks. For example, the I/O manager 213 of the file system 210 may decompress the first compressed node block of the non-volatile memory 250 corresponding to the first compressed node block log 1111 and the second compressed node block of the non-volatile memory 250 corresponding to the second compressed node block log 1112, based on the compressed node block log 1110, the first node block log 1120, and the second node block log 1130, and may store the first node block of the non-volatile memory 250 corresponding to the first node block log 1120 and the second node block of the non-volatile memory 250 corresponding to the second node block log 1130 in a free space (e.g., a part of the first free space) of the non-volatile memory 250 corresponding to the segment SG_b+i. The file system 210 may cancel a reservation of the reserved block log corresponding to the compressed node block log 1110.

Figure 12:
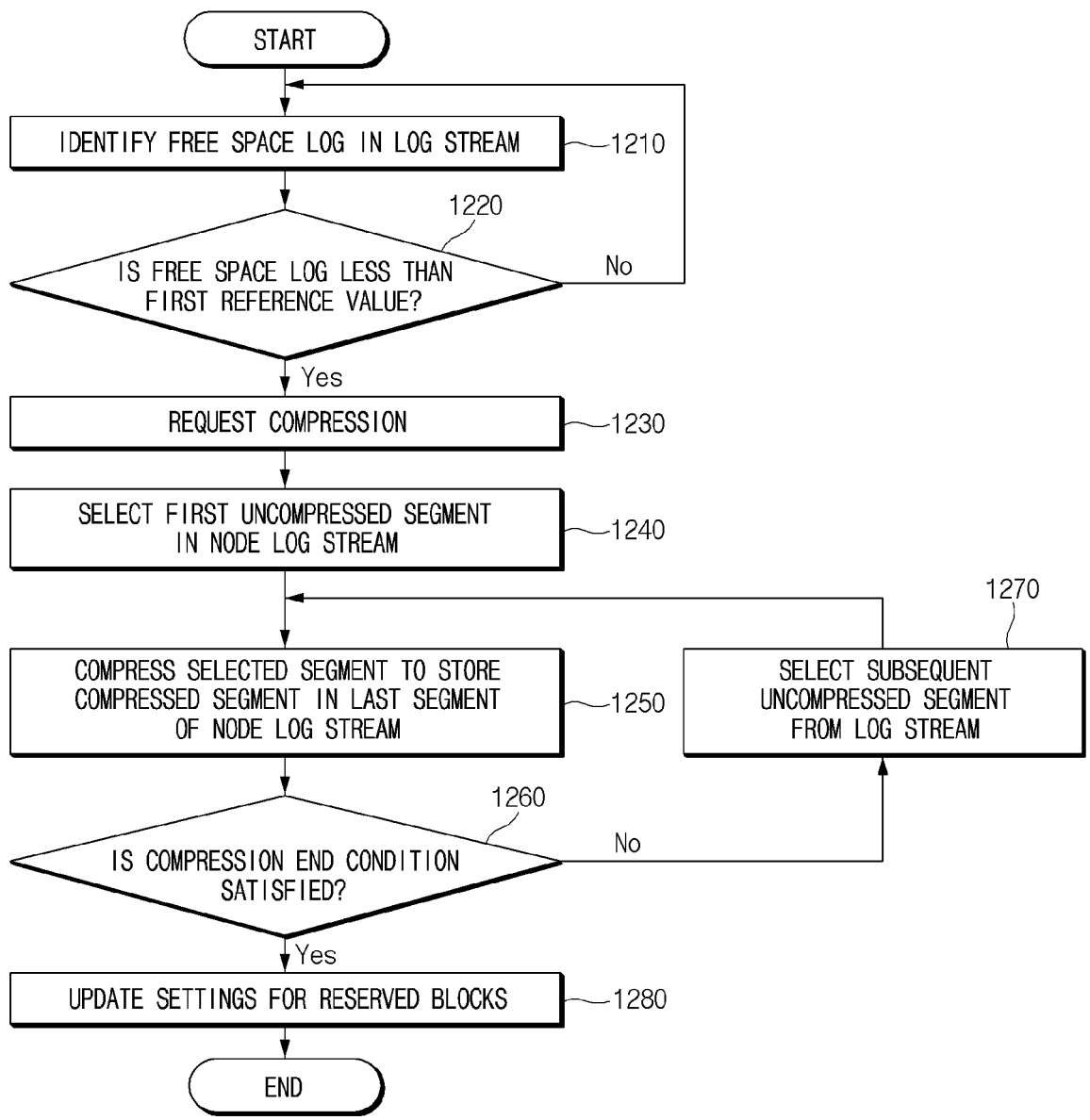
FIG. 12 is a flowchart illustrating an example data compression method, according to various embodiments.
Figure 13:
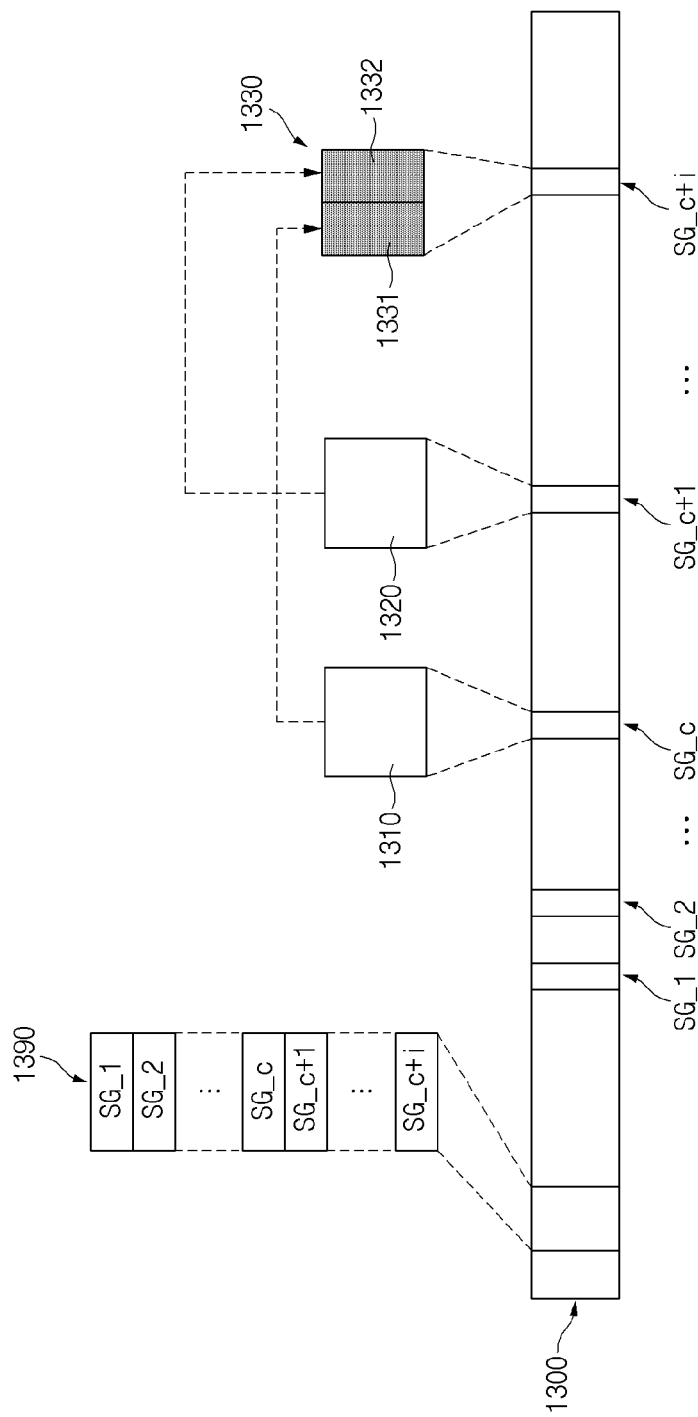
FIG. 13 is a diagram illustrating an example of a data compression method of FIG. 12 according to various embodiments.
Figure 15:
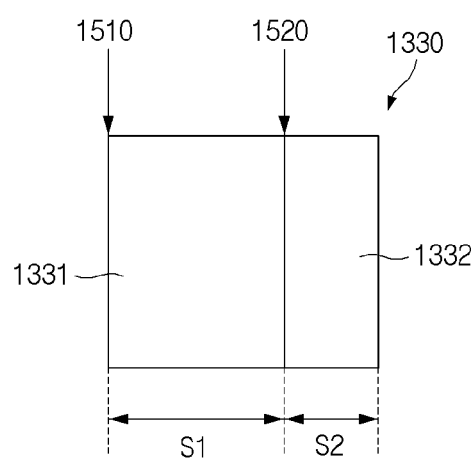
FIG. 15 is a diagram illustrating an example of a compressed segment of FIG. 13 according to various embodiments.

FIG. 12 is a flowchart illustrating an example data compression method, according to various embodiments. FIG. 13 is a diagram illustrating an example of a data compression method of FIG. 12 according to various embodiments. FIG. 14 is a diagram illustrating an example of a segment information table of FIG. 13 according to various embodiments. FIG. 15 is a diagram illustrating an example of a compressed segment of FIG. 13 according to various embodiments.

Referring to FIGS. 2 and 12 to 15, the file system 210 may manage files stored in the non-volatile memory 250 through the log stream (e.g., a log stream 1300). In FIG. 12, the file system 210 may perform compression in units of segments.

According to an embodiment, in operation 1210, the FS manager 220 may identify the free space log (e.g., the free space log 420 of FIG. 4) in the node log stream 1300. For example, the node log stream 1300 may include the free space log corresponding to the first free space (e.g., the free space 252, the first and second free spaces 252a and 252b, or the free space that is not set to the reserved block log) of the non-volatile memory 250. The FS manager 220 may monitor the free space log.

According to an embodiment, in operation 1220, when the size of the first free space indicated in the free space log is greater than or equal to a first reference value, the FS manager 220 may continuously monitor the free space log of the node log stream 1300. When the size of the first free space indicated in the free space log is less than the first reference value, the FS manager 220 may perform operation 1230.

According to an embodiment, in operation 1230, the FS manager 220 may transmit a compression request to the file system 210.

According to an embodiment, in operation 1240, the file system 210 may select a first uncompressed segment (e.g., a segment SG_c) from the node log stream 1300 in response to the compression request. For example, in FIG. 13, the node manager 211 of the file system 210 may select the uncompressed segment SG_c based on a segment information table 1390. Referring to FIG. 14, the segment information table 1390 may indicate whether each segment is compressed, and whether the each segment is valid. Also, in the case of a compressed segment, the segment information table 1390 may indicate offsets and compression sizes of compressed segments included in the corresponding segment.

According to an embodiment, in operation 1250, the file system 210 may compress the selected segment and may store it in the last segment of the node log stream 1300. For example, in FIG. 13, the segment manager 212 of the file system 210 may newly allocate a segment SG_c+i to the node log stream 1300. The node manager 211 may store compressed node block logs 1330 obtained by compressing first node block logs 1310 and second node block logs 1320 included in the selected segment SG_c in the segment SG_c+i. The compressed node block logs 1330 may include first compressed node block logs 1331 and second compressed node block logs 1332. The first compressed node block logs 1331 may correspond to the first node block logs 1310. The second compressed node block logs 1332 may correspond to the second node block logs 1320. The segment manager 212 may update the segment information table 1390. For example, the segment manager 212 may invalidate the valid block bitmap of the segment SG_c. The segment manager 212 may check the compression flag of the segment SG_c+i and may validly process the valid block bitmap. The segment manager 212 may add an offset and a compression size corresponding to the first compressed node block logs 1331 to the information of the segment SG_c+i. For example, referring to FIG. 15, in the compressed node block logs 1330, a first offset 1510 may indicate a start point of the first compressed node block logs 1331. A first compression size S1 may indicate the size of the first compressed node block logs 1331. A second offset 1520 may indicate a starting point of the second compressed node block logs 1332. A second compression size S2 may indicate the size of the second compressed node block logs 1332. The segment information table 1390 may add the first offset 1510, the first compression size S1, the second offset 1520, and the second compression size S2 to the information of the segment SG_c+i.

According to an embodiment, in operation 1260, the file system 210 may determine whether compression end condition is satisfied. For example, the compression end condition may include when compression of a specified number of segments is performed, when a specified compression execution time elapses, or when a target compression capacity is satisfied. When the compression end condition is not satisfied, in operation 1270, the file system 210 may select the subsequent uncompressed segment (e.g., the segment SG_c+1) from the node log stream 1300, and may repeat operation 1250. The file system 210 may repeat operations 1250 and 1270 until the compression end condition is satisfied. When the compression end condition is satisfied, the file system 210 may perform operation 1280.

According to an embodiment, in operation 1280, the file system 210 may update settings for reserved blocks. For example, the I/O manager 213 of the file system 210 may compress the first node blocks of the non-volatile memory 250 corresponding to the first node block logs 1310 based on the first compressed node block logs 1331, and may store the compressed node blocks corresponding to the first compressed node block logs 1331 in a free space (e.g., a part of the first free space) of the non-volatile memory 250 corresponding to the segment SG_c+i. The file system 210 may set a reserved block log (e.g., the reserved block log 430) in the segment SG_c and the segment SG_c+1 corresponding to the second free space (e.g., the third free space 252c of FIG. 5) of the non-volatile memory 250 secured by deleting the first node blocks. The file system 210 may block access of the application 230 to the second free space corresponding to the reserved block log. When the second free space corresponding to the reserved block log is recognized as a free space in the non-volatile memory 250 and when the second free block having the same size as the standard free space size in which garbage collection is performed is secured through the reserved block log, the number of executions of garbage collection may decrease.

Figure 16:
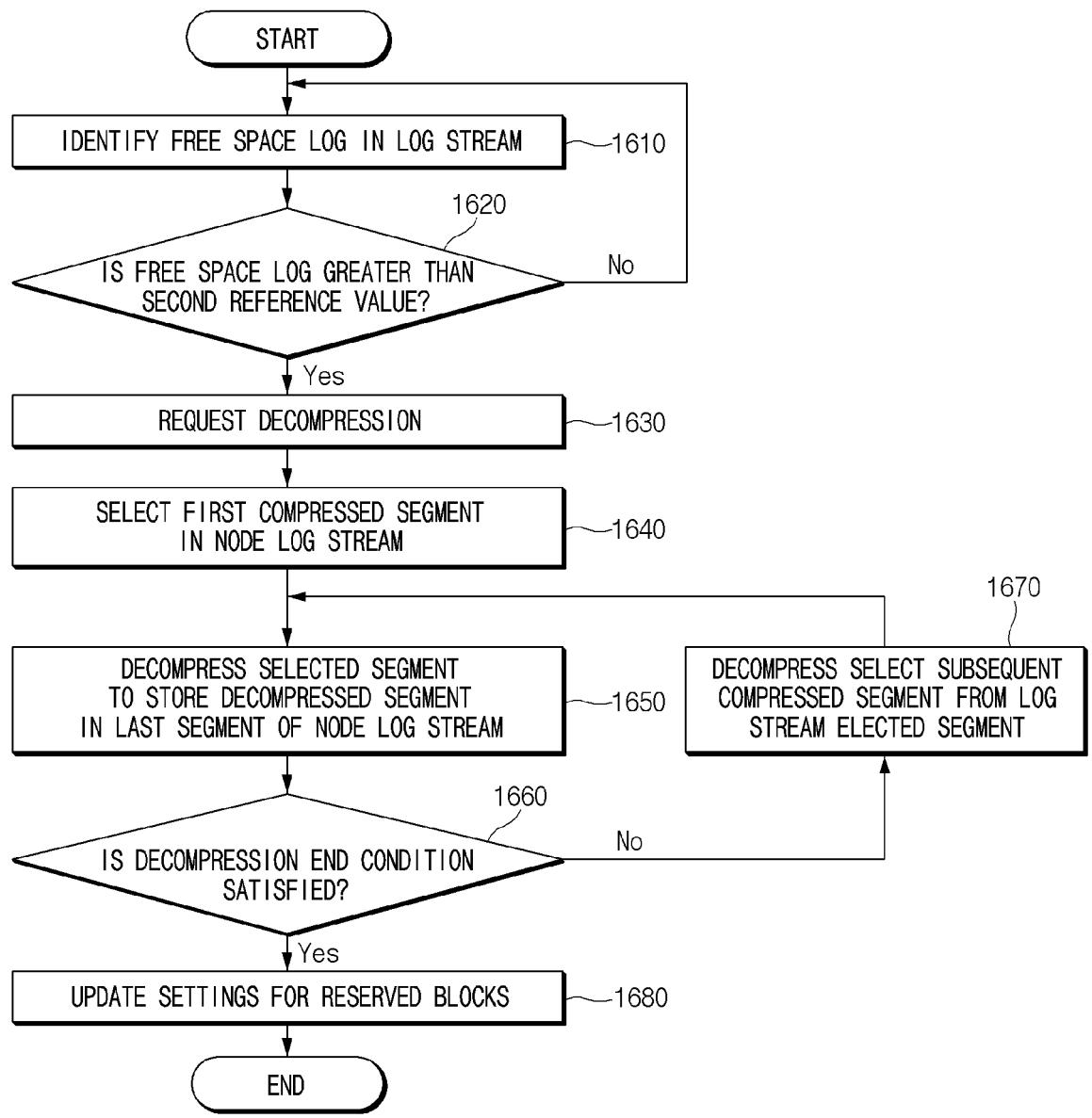
FIG. 16 is a flowchart illustrating an example method of decompressing compressed data, according to various embodiments.
Figure 17:
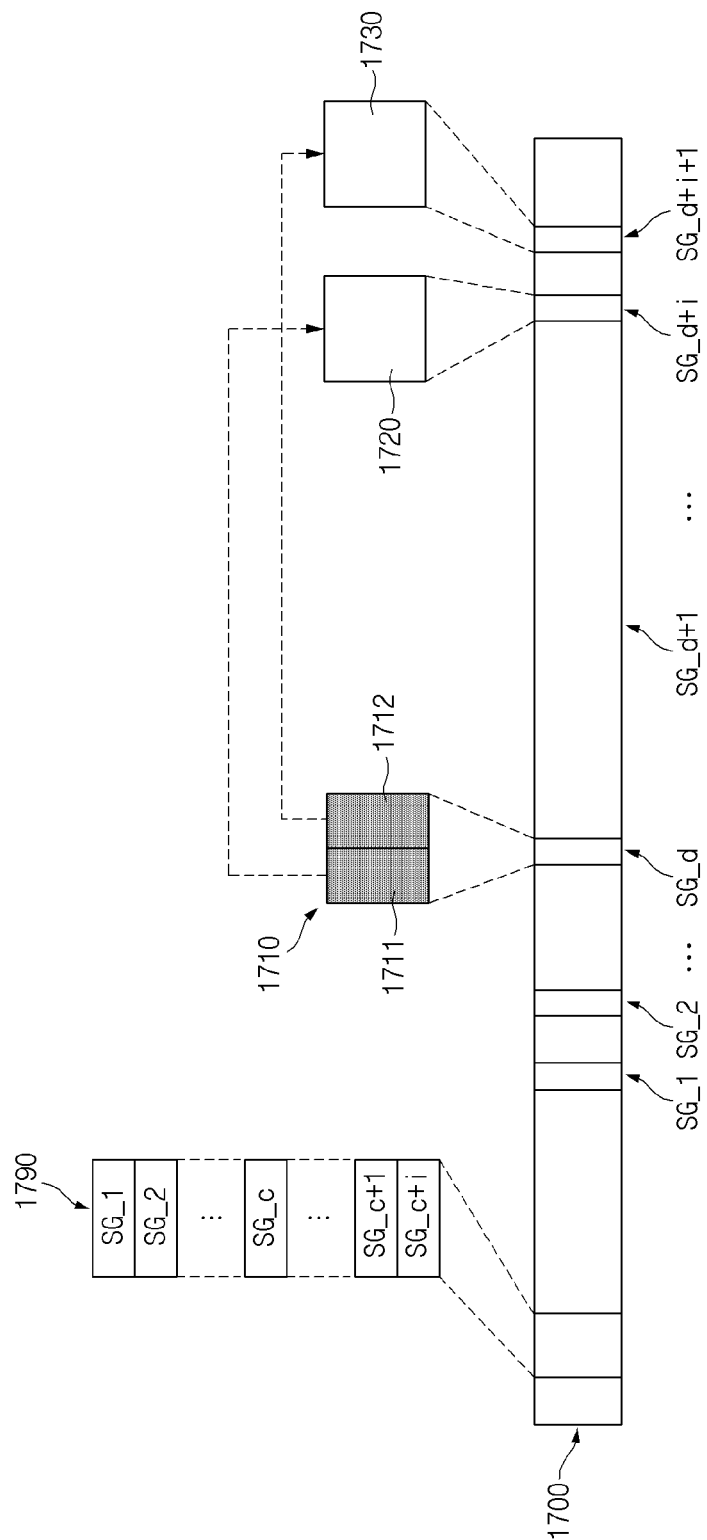
FIG. 17 is a diagram illustrating an example of a method for decompressing compressed data of FIG. 16 according to various embodiments.

FIG. 16 is a flowchart illustrating an example method of decompressing compressed data, according to various embodiments. FIG. 17 is a diagram illustrating an example of a method for decompressing compressed data of FIG. 16 according to various embodiments. FIG. 18 is a diagram illustrating an example of a segment information table of FIG. 17 according to various embodiments.

Referring to FIGS. 2 and 16 to 18, the file system 210 may decompress the node block compressed through the data compression method of FIG. 12 again.

According to an embodiment, in operation 1610, the FS manager 220 may identify the free space log (e.g., the free space log 420 of FIG. 4) in a node log stream 1700. For example, the node log stream 1700 may include the free space log corresponding to the first free space (e.g., the free space 252, the first and second free spaces 252a and 252b, or the free space that is not set to the reserved block log) of the non-volatile memory 250. The FS manager 220 may monitor the free space log.

According to an embodiment, in operation 1620, when the size of the first free space indicated in the free space log is less than or equal to a second reference value, the FS manager 220 may continuously monitor the free space log of the node log stream 1700. When the size of the first free space indicated in the free space log is greater than the second reference value, the FS manager 220 may perform operation 1630. For example, the second reference value may be set to be greater than the first reference value of FIG. 12. As another example, the second reference value may be set to be the same as the first reference value of FIG. 12.

According to an embodiment, in operation 1630, the FS manager 220 may transmit a decompression request to the file system 210.

According to an embodiment, in operation 1640, the file system 210 may select a first compressed segment (e.g., a segment SG_d) compressed from the node log stream 1700 in response to the compression request. For example, in FIG. 17, the node manager 211 of the file system 210 may select the segment SG_d including compressed node block logs 1710 that are compressed based on a segment information table 1790. For example, the compressed node block logs 1710 may include first compressed node block logs 1711 and second compressed node block logs 1712. The segment information table 1790 may indicate the compression flag and valid block bitmap of the segment SG_d, the first offset and the first compression size of the first compressed node block logs 1711, and the second offset and the second compression size of the second compressed node block logs 1712.

According to an embodiment, in operation 1650, the file system 210 may decompress the selected compressed segment and may store it in the last segment of the node log stream 1700. For example, in FIG. 17, the segment manager 212 of the file system 210 may newly allocate a segment SG_d+i and a segment SG_d+i+1 to the node log stream 1700. The node manager 211 may store decompressed first node block logs 1720 in the segment SG_d+i. In addition, the node manager 211 may store decompressed second node block logs 1730 in the segment SG_d+i+1. The segment manager 212 may update the segment information table 1790. For example, in the segment information table 1790, the segment manager 212 may invalidate the segment SG_d. In the segment information table 1790, the segment manager 212 may cancel the compression flag associated with the segment SG_d+i and the segment SG_d+i+1 and may validly process the valid block bitmap.

According to an embodiment, in operation 1660, the file system 210 may determine whether a decompression end condition is satisfied. For example, the decompression end condition may include when a size of the first free space indicated in the free space log of the log stream 1700 reaches a specified size (e.g., a value greater than or equal to the first reference value and less than or equal to the second reference value) or when all compressed node block logs are decompressed. Alternatively, the decompression end condition may include when decompression of a specified number of segments is performed, when a specified decompression execution time elapses, or when the size of the first free space indicated in the free space log of the non-volatile memory 250 is insufficient. When the decompression end condition is not satisfied, in operation 1670, the file system 210 may select the subsequent compressed segment from the node log stream 1700 and may repeat operation 1650. The file system 210 may repeat operations 1650 and 1670 until the decompression end condition is satisfied. When the decompression end condition is satisfied, the file system 210 may perform operation 1680.

According to an embodiment, in operation 1680, the file system 210 may update settings for reserved blocks. For example, the I/O manager 213 of the file system 210 may decompress first compressed node blocks of the non-volatile memory 250 corresponding to the first compressed node block logs 1711 and second compressed node blocks of the non-volatile memory 250 corresponding to the second compressed node block logs 1712, based on the compressed node block logs 1710, the first node block logs 1720, and the second node block logs 1730, and may store the first node blocks of the non-volatile memory 250 corresponding to the first node block logs 1720 and the second node blocks of the non-volatile memory 250 corresponding to the second node block logs 1730 in a free space (e.g., a part of the first free space) of the non-volatile memory 250 corresponding to the segment SG_d+i and the segment SG_d+i+1. The file system 210 may cancel a reservation of the reserved block log corresponding to the compressed node block log 1710.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a non-volatile memory configured to store at least one file including meta data and user data;
   a file system comprising circuitry configured to manage the at least one file through a log stream; and
   a file system (FS) manager, comprising processor circuitry, configured to monitor a free space log included in the log stream corresponding to a first free space of the non-volatile memory, and to transmit a compression request to the file system based on a size of the first free space indicated in the free space log being less than a first reference value, and
   wherein, the file system is configured to:
      based on the compression request being received:
         select a first segment including an uncompressed node block log from the log stream;
         select at least one uncompressed node block log included in the selected first segment;
         store a compressed node block log obtained by compressing the at least one uncompressed node block in a last segment of the log stream;
         store a compressed node block corresponding to the compressed node block log in the first free space; and
         indicate a second free space of the non-volatile memory secured through compression of the at least one uncompressed node block log as a reserved block log in the log stream; and
      based on a decompression request being received from the FS manager when the size of the first free space indicated in the free space log being greater than a second reference value:
         select a first compressed segment including a compressed node block log from the log stream;
         select the compressed node block log included in the selected compressed segment;
         store a decompressed node block log obtained by decompressing the compressed node block log in a new last segment of the log stream;
         store a decompressed node block obtained by decompressing a compressed node block corresponding to the compressed node block log in the first free space of the non-volatile memory; and cancel a reservation of a reserved block log corresponding to decompression of the compressed node block log based on a decompression end condition being satisfied.

2. The electronic device of claim 1, further comprising:
an application configured to access the non-volatile memory through the file system, and
wherein the file system is configured to block access of the application with respect to the second free space corresponding to the reserved block log.

3. The electronic device of claim 1, wherein the FS manager is configured to transmit a decompression request to the file system based on a size of the first free space indicated in the free space log being greater than a second reference value;
wherein, the file system is configured to:
based on the decompression request being received, search for a compression block log corresponding to compressed metadata in the log stream; and
decompress the compressed meta data in the non-volatile memory based on the compression block log.

4. The electronic device of claim 3, wherein the file system is configured to:
update the reserved block log based on the decompression.

5. The electronic device of claim 3, wherein the FS manager is configured to set the second reference value to be greater than the first reference value.

6. The method of claim 1, further comprising:
based on the decompression end condition not being satisfied, selecting, by the file system, a subsequent segment including a subsequent compressed node block log from the log stream; and
repeatedly performing selecting the compressed node block log, storing the decompressed node block log obtained by the decompressing in the new last segment of the log stream, and storing the decompressed node block obtained by the decompressing the compressed node block in the first free space of the non-volatile memory.

7. The method of claim 1, wherein the decompression end condition includes the size of the first free space indicated in the free space log reaching a specified size, all compressed node block logs being uncompressed, decompression of a specified number of compressed node block logs being performed, or the specified decompression execution time elapsing.

8. The method of claim 1, wherein the file system blocks access of an application with respect to the second free space of the non-volatile memory corresponding to the reserved block log.

9. A memory management method of an electronic device including a non-volatile memory, the method comprising:
monitoring, by a file system (FS) manager, a free space log corresponding to a first free space of the non-volatile memory in a log stream generated to manage at least one file stored in the non-volatile memory;
transmitting a compression request from the FS manager to a file system managing the log stream based on a size of the first free space indicated in the free space log being less than a first reference value;
selecting, by the file system, a first segment including an uncompressed node block log from the log stream;
selecting, by the file system, at least one uncompressed node block log included in the selected segment;
storing, by the file system, a compressed node block log obtained by compressing the at least one uncompressed node block log in a last segment of the log stream;
storing, by the file system, a compressed node block corresponding to the compressed node block log in the first free space of the non-volatile memory;
indicating, by the file system, a second free space of the non-volatile memory secured through compression of the at least one uncompressed node block log as a reserved block log in the log stream based on a compression end condition being satisfied;
transmitting a decompression request from the FS manager to the file system based on the size of the first free space indicated in the free space log being greater than a second reference value;
selecting, by the file system, a first compressed segment including a compressed node block log from the log stream;
selecting, by the file system, the compressed node block log included in the selected compressed segment;
storing, by the file system, a decompressed node block log obtained by decompressing the compressed node block log in a new last segment of the log stream;
storing, by the file system, a decompressed node block obtained by decompressing a compressed node block corresponding to the compressed node block log in the first free space of the non-volatile memory; and
canceling, by the file system, a reservation of a reserved block log corresponding to decompression of the compressed node block log based on a decompression end condition being satisfied.

10. The method of claim 9, further comprising:
based on the compression end condition not being satisfied, selecting, by the file system, a subsequent segment including an uncompressed node block log from the log stream; and
repeatedly performing selecting the at least one node block log, storing the compressed node block log in the last segment of the log stream, and storing the compressed node block in the first free space of the non-volatile memory.

11. The method of claim 9, wherein the compression end condition includes a compression being performed on a specified number of node block logs, a specified compression execution time elapsing, or a target compression capacity being satisfied.

12. The method of claim 9, wherein the log stream includes a compressed node bitmap indicating whether the at least one node block log is compressed, and
wherein the file system selects the first segment based on the compressed node bitmap.

13. The method of claim 9, wherein the log stream includes a node address table indicating a node block address of the at least one node block log, and
wherein the file system indicates an offset and compression size of the at least one node block log in the node address table based on the at least one node block log being compressed.

14. A memory management method of an electronic device including a non-volatile memory, the method comprising:
monitoring, by a file system (FS) manager, a free space log corresponding to a first free space of the non-volatile memory in a log stream generated to manage at least one file stored in the non-volatile memory;
transmitting a compression request from the FS manager to a file system managing the log stream based on a size of the first free space indicated in the free space log being less than a first reference value;

selecting, by the file system, a first uncompressed segment from the log stream;

storing, by the file system, a compressed segment obtained by compressing the selected segment in a last segment of the log stream;

storing, by the file system, compressed blocks obtained by compressing node blocks corresponding to the selected segment in the first free space of the non-volatile memory;

indicating, by the file system, a second free space of the non-volatile memory secured through compression of the selected segment as a reserved block log based on a compression end condition being satisfied;

transmitting a decompression request from the FS manager to the file system based on the size of the first free space indicated in the free space log being greater than a second reference value;

selecting, by the file system, a first compressed segment from the log stream;

storing, by the file system, a decompressed segment obtained by decompressing the compressed segment in a new last segment of the log stream;

storing, by the file system, decompressed blocks obtained by decompressing compressed node blocks corresponding to the compressed segment in the first free space of the non-volatile memory; and canceling, by the file system, a reservation of a reserved block log corresponding to decompression of the compressed segment based on a decompression end condition being satisfied.

15. The method of claim 14, wherein, based on the compression end condition not being satisfied, selecting, by the file system, an uncompressed subsequent segment from the log stream, and repeatedly performing storing the compressed segment obtained by compressing the selected segment in the last segment of the log stream and storing the compressed blocks obtained by compressing the node blocks corresponding to the selected segment in the first free space of the non-volatile memory.

16. The method of claim 14, wherein the compression end condition includes a compression being performed on a specified number of segments, a specified compression execution time elapsing, or a target compression capacity being satisfied.

17. The method of claim 14, wherein the log stream includes a segment information table indicating whether segments are compressed and whether segments are valid, and wherein the file system indicates an offset and compression size of a compressed segment corresponding to the selected segment in the segment information table.

18. The method of claim 14, further comprising:

based on the decompression end condition not being satisfied, selecting, by the file system, a subsequent compressed segment from the log stream; and repeatedly performing storing the decompressed segment obtained by the decompressing the compressed segment in the new last segment of the log stream and storing the decompressed blocks obtained by the decompressing in the first free space of the non-volatile memory.

\* \* \* \* \*